United States Patent [19]

Jeddeloh et al.

[11] Patent Number: 5,430,742
[45] Date of Patent: Jul. 4, 1995

[54] MEMORY CONTROLLER WITH ECC AND DATA STREAMING CONTROL

[75] Inventors: Joseph M. Jeddeloh, Minneapolis; A. Kent Porterfield, New Brighton, both of Minn.

[73] Assignee: AST Research, Inc., Irvine, Calif.

[21] Appl. No.: 960,907

[22] Filed: Oct. 14, 1992

[51] Int. Cl.[6] ........................................ H03M 13/00
[52] U.S. Cl. .................................. 371/40.1; 371/40.2
[58] Field of Search .................. 371/40.1, 2.2, 21.2, 371/37.3, 40.2, 50.1

[56] References Cited

U.S. PATENT DOCUMENTS

| | | | |
|---|---|---|---|
| 4,493,081 | 1/1985 | Schmidt | 371/37.3 |
| 4,884,271 | 11/1989 | Concha et al. | 371/40.2 |
| 4,979,173 | 12/1990 | Geldman et al. | 371/39.1 |
| 5,001,624 | 3/1991 | Hoffman et al. | 364/200 |
| 5,008,886 | 4/1991 | Chinnaswamy et al. | 371/40.2 |
| 5,040,179 | 8/1991 | Chen | 371/37.1 |
| 5,058,005 | 10/1991 | Culley | 364/200 |
| 5,274,768 | 12/1993 | Traw et al. | 395/725 |
| 5,313,475 | 5/1994 | Cromer et al. | 371/40.1 |
| 5,325,375 | 6/1994 | Westberg | 371/51.1 |

FOREIGN PATENT DOCUMENTS 2-098121 4/1990 Japan.

OTHER PUBLICATIONS

Yeh et al., "The Knockout Switch: A Simple, Modular Architecture for High-Performance Packet Switching", IEEE Journal on Selected Areas in Communications; vol. Sac 5, No. 8, 1987 pp. 1274–1283.

Booklet, Micral, Inc., "SLIK486+: 486+ SLIK-Based PS/2 Compatible System," (Sep. 8, 1992).

Booklet, Micral, Inc., "AZ9032: Memory/Bus Controller," (Apr. 8, 1992).

Primary Examiner—Roy N. Envall, Jr.
Assistant Examiner—Chuong D. Ngo
Attorney, Agent, or Firm—Westman, Champlin & Kelly

[57] ABSTRACT

Data is written to a memory subsystem in a computer system, wherein the data is supplied by an input/output (I/O) bus. The I/O bus provides a STROBE signal, the occurrence of which is indicative of a time when an I/O data word on the I/O bus is valid. A first I/O data word provided by the I/O bus, after a first occurrence of the STROBE signal, is stored in a data buffer. A memory data word is retrieved from the memory subsystem in response to the first occurrence of the STROBE signal. A second I/O data word provided by the I/O bus, after a second occurrence of the STROBE signal, is stored in the data buffer. The memory data word is modified by the first and second I/O data words to form a modified data word. Error detection information corresponding to the modified data word is generated and the modified data word and the error detection information are written to the memory subsystem.

28 Claims, 4 Drawing Sheets

MEMORY CONTROLLER WITH ECC AND DATA STREAMING CONTROL

INCORPORATION BY REFERENCE

The following specifications are hereby incorporated by reference:
- a document provided by the Intel Corporation of Phoenix, Ariz., entitled "Microprocessors Volume 1," published in 1992;
- a document entitled "IBM Hardware Technical Reference Micro Channel Architecture," provided by International Business Machines Corp. of Armonk, N.Y.;
- the specification entitled "AZ9032 Memory/Bus Controller," provided by Micral, Inc. of Minneapolis, Minn.; and
- the specification entitled "486+ SLIK-Based PS/2 Compatible System," provided by Micral, Inc. of Minneapolis, Minn.

BACKGROUND OF THE INVENTION

The present invention relates to a system for writing data to a memory subsystem in a computer system. More particularly, the present invention relates to a memory controller which provides error correction code (ECC) and data streaming compatibility and control.

A computer system typically includes a microprocessor and a number of subsystems. Examples of subsystems used in a computer system include a memory subsystem and an input/output (I/O) bus subsystem. The memory subsystem commonly includes a block of dynamic random access memory (DRAM) devices. The block of DRAMs stores a wide variety of information used to support the computer system.

The I/O bus system includes an I/O bus which provides the processor with access to other devices external to the computer system such as memory devices, slave-type devices, or other processors. One typical I/O bus is the Micro Channel bus manufactured by International Business Machines Corp. of Armonk, N.Y.

In addition to the memory subsystem and the I/O bus subsystem, a computer system also typically includes some type of processor interface between the microprocessor and the subsystems. The interface provides communication between the processor and the various subsystems in the computer system. In the case of a computer system having a memory subsystem and an I/O bus subsystem, the interface provides communication between the processor and the I/O bus, as well as between the processor and memory devices in the memory subsystem.

Such interfaces typically include bus controller circuitry for acquiring control of the I/O bus, and for providing timing control between the I/O bus and the processor. The bus controller circuitry receives processor request signals from the processor such as command signals, address signals and data signals which represent a requested I/O bus operation. The bus controller circuitry then controls the I/O bus in accordance with those processor request signals to accomplish the requested operation.

The interface also typically includes a memory controller which provides timing control between the processor and the memory devices, as well as between the I/O bus and the memory devices. The memory controller receives request signals from either the processor or the I/O bus, such as command signals, address signals and data signals which represent a requested memory operation. The memory controller then controls the memory devices based on those request signals to accomplish the requested operation.

Two techniques have evolved in the computer industry which are very desirable. The first is the technique of implementing error correction code (ECC) into the data written to and read from memory devices in the computer system. ECC information is used to detect and correct errors in information recovered from a memory device. The ECC information is generated based upon the data word to be stored in the memory device and based upon the particular code being used. Once generated, the ECC information is appended to the data word to be stored, and the entire word, including the ECC information, is written to the memory device. Upon recovery of the information from the memory device, the ECC information is recovered and decoded. Based upon the decoded ECC information, the computer system can determine whether the data word recovered from the memory device contains an error. In certain cases, with the use of certain known ECC techniques, the computer system can not only determine whether an error has occurred in recovering the data word, but the computer system can also regenerate the proper information to correct the data word.

The use of ECC information does, however, present certain problems. The generation and decoding of ECC information is quite cumbersome and time consuming. This slows down the data transfer rate achievable by computer systems implementing ECC techniques. This slow-down is largely attributable to the read-modify-write scheme which must be utilized in writing information using ECC techniques. For example, if one desires to write to one single byte of memory (DRAM) which is accessed in multiple byte segments, several memory accesses are required. First, the data which is already written in the multiple byte memory segment must be read. Then, the particular byte of the multiple byte segment which is to be rewritten must be modified to include the new byte of information. Then, new ECC information must be generated for the new multiple byte data word. Finally, the new multiple byte data word, along with the new ECC information, must be rewritten to the memory device at the desired location. Thus, each write requires two memory accesses (i.e., a read and a write). This results in slower memory transfer times.

In the past, byte-based ECC techniques have been used to increase performance of memory devices. By basing the ECC information on a byte-sized portion of data, the read-modify-write technique is avoided. However, this approach is very expensive due to the increased memory required for the extra ECC information, and due to the need for nonstandard single in-line memory modules (SIMMS) in such a system.

Not only is it desirable to have a computer system which supports ECC techniques, it is also desirable to have a computer system which supports a technique known as data streaming. Data streaming is a technique which provides for mass memory transfers to and from the DRAMs in a computer system via the I/O bus. In Micro Channel Architecture, a starting address and a data STROBE signal are provided by the bus master controlling the Micro Channel bus. The starting address indicates the location at which the mass memory transfer is to begin. The STROBE signal occurs once every 100 nanoseconds and indicates that a 32 bit data word provided by the I/O Micro Channel bus is valid. Thus, current Micro Channel technology provides an I/O bus which can transfer data at a rate of 32 bits every 100 nanoseconds. This type of data streaming requires memory which can be configured for fast transfer rates.

Today's DRAMs are also capable of running in what is referred to as "page mode." Page mode is a fast memory transfer for a large segment of data. One page mode memory access can typically be completed within 100 nanoseconds. In page mode, the row address select (RAS) input to the DRAMs is held active while the column address select (CAS) for the DRAMs is used to clock the proper address into the memory. Since the amount of set-up time required between CAS signals is relatively short, a memory transfer which involves consecutive memory segments can be accomplished quickly using DRAMs operating in page mode.

A problem arises when trying to provide a computer system which utilizes the desirable techniques of ECC and data streaming. Data streaming requires memory devices with fast access times while ECC techniques are slow and cumbersome and require multiple memory accesses for each memory write.

SUMMARY OF THE INVENTION

The present invention provides a system which is suitable for using both error correction code (ECC) and data streaming techniques.

Data is written to a memory subsystem in a computer system wherein the data is supplied by an input/output (I/O) bus and wherein the I/O bus provides a STROBE signal. The occurrence of the STROBE signal is indicative of a time when an I/O data word on the I/O bus is valid. A first I/O data word provided by the I/O bus, after a first occurrence of the STROBE signal, is stored in data buffer means. A memory data word from the memory subsystem is retrieved in response to the first occurrence of the STROBE signal. A second I/O data word provided by the I/O bus, after a second occurrence of the STROBE signal, is stored in the buffer means. The memory data word is modified with the first and second I/O data words to form a modified data word. Error detection information is generated which corresponds to the modified data word. The modified data word, as well as the error correction information, is written to the memory subsystem.

DETAILED DESCRIPTION OF THE PREFERRED EMBODIMENTS

Figure 1:
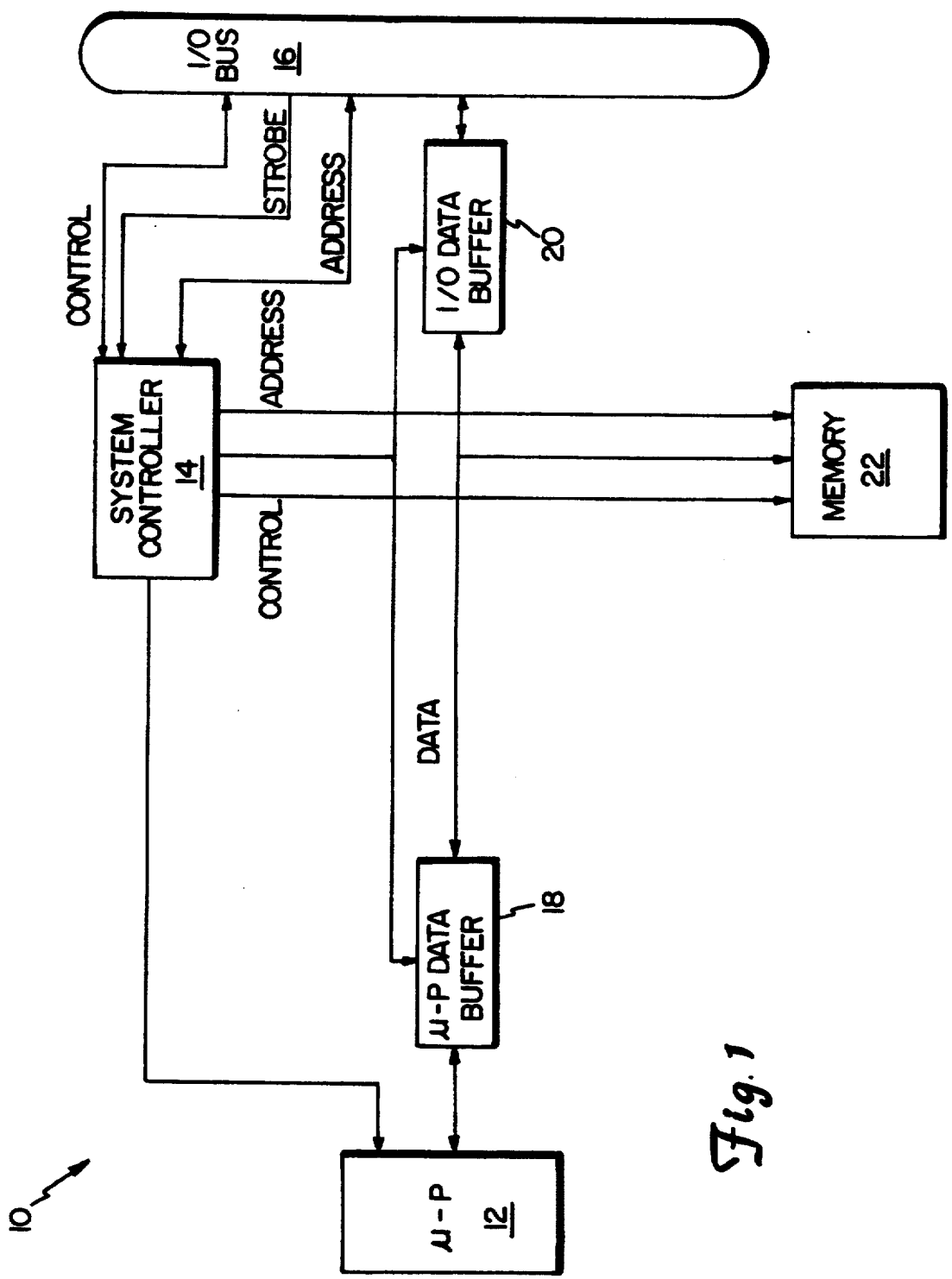
FIG. 1 is a block diagram of a computer system according to the present invention.

FIG. 1 is a block diagram of computer system 10 of the present invention. Computer system 10 includes microprocessor 12, system controller 14, I/O bus 16, microprocessor data buffer 18, I/O data buffer 20 and memory 22. Microprocessor 12 can be one of any number of processors. For purposes of this disclosure, processor 12 is described with reference to an Intel 80486 processor. Microprocessor 12 is coupled to system controller 14, typically through a processor bus which is not shown independently in FIG. 1. Microprocessor 12 provides address and control signals to system controller 14. The control signals typically include encoded request signals which represent a requested operation to be performed by system controller 14. The address signals identify the location at which the requested operation is to be performed.

System controller 14 is coupled to memory 22, I/O bus 16 and data buffers 18 and 20. System controller 14 decodes the control signals provided by microprocessor 12 and executes the requested operation by controlling the other components of computer system 10 based on the control and address signals provided by microprocessor 12.

I/O bus 16, in this preferred embodiment, is a Micro Channel Architecture bus which is suitable for coupling computer system 10 to external devices, or other computer systems. I/O bus 16 is typically controlled by a bus master which is not shown in FIG. 1. The bus master can be a 16 bit bus master or any other suitable width. In the preferred embodiment, the bus master is 32 bits wide. System controller 14 contains I/O bus control circuitry which obtains control of I/O bus 16 and provides proper timing for interaction with I/O bus 16, and devices coupled to I/O bus 16.

I/O bus 16 provides system controller 14 with address and control signals. The address and control signals represent a requested operation and a location at which the requested operation is to be performed. System controller 14 then performs the requested operation at the desired address.

Memory 22, in this preferred embodiment, is a block of dynamic random access memories (DRAMs). The DRAMs can take any number of forms. However, in the preferred embodiment, memory 22 includes a block of standard 36 bit single in-line memory modules (SIMMS). Memory 22 stores a wide range of information used in computer system 10.

Microprocessor data buffer 18 and I/O data buffer 20 each receive and temporarily store data from microprocessor 12 and I/O bus 16, respectively. Data buffers 18 and 20 are controlled by system controller 14 to transfer data within computer system 10 among microprocessor 12, I/O bus 16 and memory 22.

In this preferred embodiment, I/O bus 16 is capable of requesting system controller 14 to write data from I/O bus 16 into memory 22. I/O bus 16 is also capable of operating in a data streaming mode in which I/O bus 16 provides a starting address indicating the location at which a mass memory transfer is to begin. I/O bus 16 also provides a 32 bit data word (or 16 bits for a 16 bit bus master) to I/O data buffer 20 with each occurrence of a STROBE signal. The STROBE signal indicates a time period during which the 32 bit data word provided by I/O bus 16 is valid.

System controller 14 accesses the DRAMs of memory 22, in this preferred embodiment, in 64 bit segments. System controller 14 configures the 32 bit words provided by I/O bus 16 into 64 bit segments in I/O data buffer 20. By utilizing the STROBE signal of I/O bus 16, as well as the address provided by I/O bus 16, system controller 14 causes the 64 bit segments assembled in I/O data buffer 20, and provided by I/O bus 16, to be written into the DRAMs of memory 22. Also, by utilizing the STROBE signal provided by I/O bus 16 to control the addressing of the DRAMs in memory 22, system controller 14 controls memory 22 to be written with data, using error correction code schemes, at a pace adequate to accommodate the data streaming techniques implemented in the Micro Channel Architecture I/O bus 16.

Figure 2:
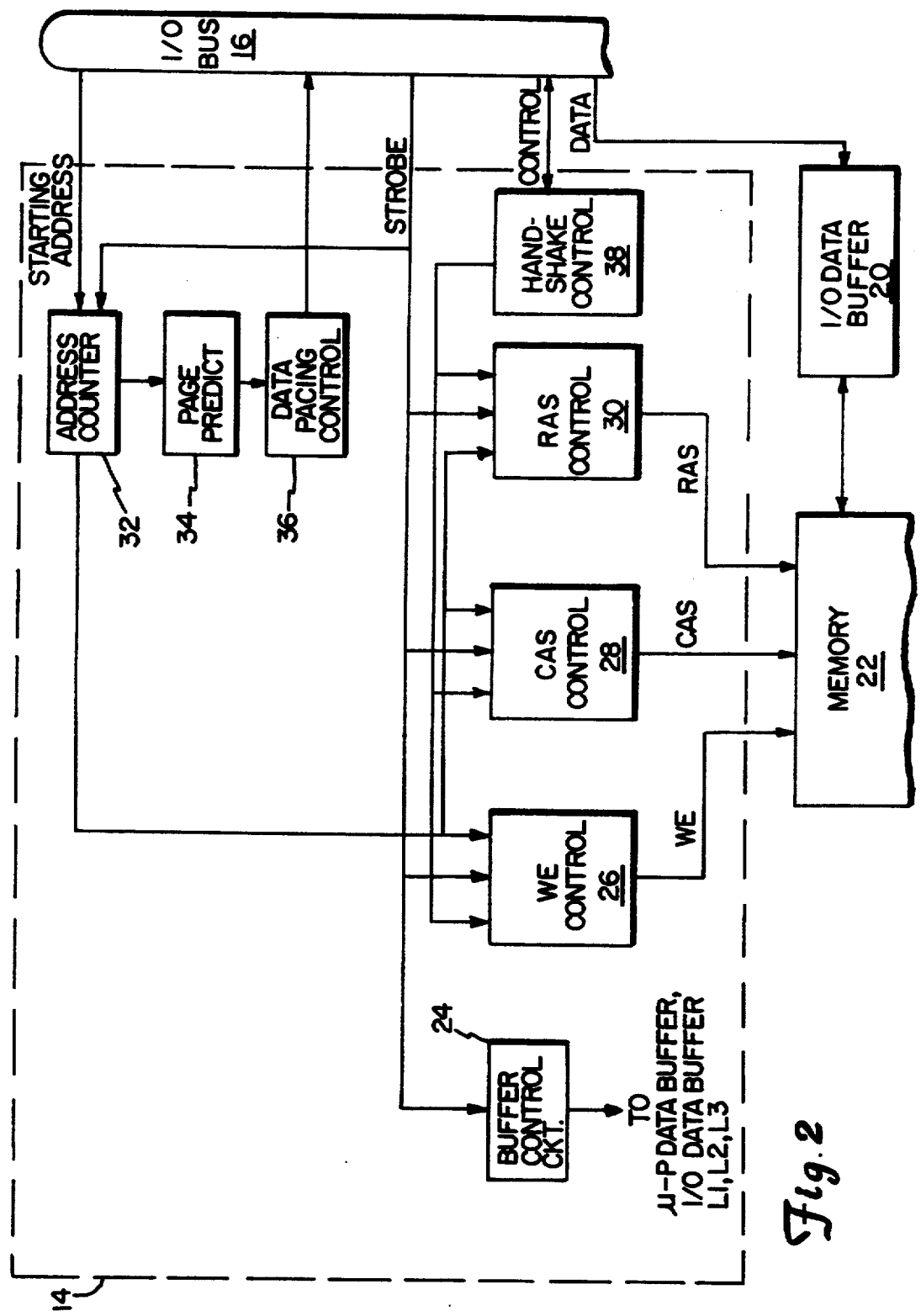
FIG. 2 is a more detailed block diagram of the system controller shown in FIG. 1.

FIG. 2 shows a portion of computer system 10 with a more detailed block diagram of system controller 14. System controller 14 includes buffer control circuit 24, write enable (WE) control circuit 26, column address select (CAS) control circuit 28, row address select (RAS) control circuit 30, address counter 32, page predict circuit 34, data pacing control circuit 36 and handshake control circuit 38. I/O bus 16 provides address signals, the STROBE signal and control signals to system controller 14. The address signal, in this preferred embodiment, includes a starting address. Based upon the starting address, the control signals and the STROBE signal, system controller 14 controls memory 22. Since the present invention is particularly relevant to operations wherein I/O bus 16 provides data to be written to memory 22 in a data streaming mode, this disclosure will proceed with a description of that type of operation.

I/O bus 16 first provides a starting address to address counter 32 of system controller 14. The starting address indicates the location at which the data streaming memory transfer is to begin. Address counter 32 provides a decoded starting address to WE control circuit 26, CAS control circuit 28 and RAS control circuit 30. I/O bus 16 also provides the STROBE signal, the occurrence of which indicates a time when the 32 bit data word provided by I/O bus 16 is valid. Based upon the address signal, and the STROBE signal, system controller 14 provides the WE, CAS and RAS signals to memory 22 to perform a write operation. Also, based on the STROBE signal, buffer control circuit 24 provides control signals to I/O data buffer 20. This will be described in greater detail later in the specification.

I/O bus 16 also provides control signals to handshake control circuit 38 of system controller 14. The control signals provided to handshake control circuit 38 indicate whether I/O bus 16 is presently performing a data streaming operation. Handshake control circuit 38, in turn, provides the WE control circuit 26, CAS control circuit 28 and RAS control circuit 30 with an indication that a data streaming operation is to occur. Based on the control signals, the starting address signal and the STROBE signal, system controller 14 controls the DRAMs of memory 22 in page mode to accomplish the data streaming memory transfer initiated by I/O bus 16.

Since the DRAMs of memory 22 can only be operated in page mode for one page at a time, page predict circuit 34 is provided. Address counter 32 is loaded with the starting address and receives the STROBE signal from I/O bus 16. Address counter 32 is clocked by the STROBE signal to increment the address being accessed in memory 22. The actual increment is determined by the size of the bus master controlling I/O bus 16. For example, if the bus master is a 16 bit bus master, address counter 32 increments half as often as if the bus master is 32 bits wide. In any case, address counter 32 provides an address count to page predict circuit 34. When a page boundary for the DRAMs in memory 22 is reached, page predict circuit 34 indicates to data pacing control circuit 36 that the page boundary has been reached. Data pacing control circuit 36, in turn, provides a pacing signal to I/O bus 16. The pacing signal causes the bus master controlling I/O bus 16 to slow the pacing of data being provided by I/O bus 16 until the page boundary has been traversed and the DRAMs in memory 22 can again be operated in page mode. At that point, the data streaming pace is again resumed by I/O bus 16.

During the data streaming operation, the STROBE signal occurs every 100 nanoseconds. At the occurrence of the STROBE signal, buffer control circuit 24 causes I/O data buffer 20 to receive, and temporarily store, a 32 bit data word provided by I/O bus 16. Also, at the first occurrence of the STROBE signal, WE control circuit 26, CAS control circuit 28 and RAS control circuit 30 perform a page mode read operation on the DRAMs of memory 22. This causes a 64 bit data segment located at the starting address provided by I/O bus 16, to be provided to I/O data buffer 20. Buffer control circuit 24 also controls I/O data buffer 20 to receive and temporarily store this 64 bit data segment from memory 22. On the next occurrence of the STROBE signal, buffer control circuit 24 causes I/O data buffer 20 to receive a second 32 bit data word from I/O bus 16. I/O data buffer 20 then merges both of the 32 bit data words received from I/O bus 16 into the 64 bit data segment from memory 22 to create a new or modified data segment which is to be written to memory 22. I/O data buffer 20 then generates ECC data which corresponds to the new or modified 64 bit data segment. WE control circuit 26, CAS control circuit 28 and RAS control circuit 30 then cause the newly modified, 64 bit data segment stored in I/O data buffer 20, as well as the corresponding ECC information stored in data buffer 20, to be written in page mode fashion to memory 22.

At the third occurrence of the STROBE signal, address counter 32 increments the address being accessed in memory 22, and the cycle is repeated. In other words, WE control circuit 26, CAS control circuit 28 and RAS control circuit 30 cause a 64 bit data segment located at the next consecutive address to be read out of memory 22 and stored in I/O data buffer 20. Buffer control circuit 24 also causes I/O data buffer 20 to receive and temporarily store a first 32 bit data word from I/O bus 16.

Upon the fourth occurrence of the STROBE signal, system controller 14 performs the same steps it performed upon the second occurrence of the STROBE signal. That is, buffer control circuit 24 causes I/O data buffer 20 to receive and store the second 32 bit data segment provided by I/O bus 16. Also, the buffer control circuit 24 causes I/O data buffer 20 to merge the two 32 bit data words received from I/O bus 16 with the 64 bit data segment read from memory 22. Then, I/O data buffer 20 generates ECC data corresponding to the modified 64 bit data segment and WE control circuit 26, CAS control circuit 28 and RAS control circuit 30 cause the newly modified 64 bit data segment in I/O data buffer 20 to be written into the DRAMs of memory 22 at the starting address provided by I/O bus 16. This process continues until all of the data has been transferred from its source location, via I/O bus 16, to its destination in memory 22.

It can be seen that the DRAMs of memory 22 are alternately accessed first with a read operation, and then with a write operation, with each occurrence of the STROBE signal. In page mode, each read and write access can be accomplished within the 100 nanosecond time period of the STROBE signal. Further, by accessing memory 22 in segments having a width which is twice as wide (e.g., 64 bits) as each data word received from I/O bus 16 (e.g., 32 bits), memory 22 need only be accessed once during the time period of each STROBE signal. With the first STROBE signal, memory 22 is read. With the next STROBE signal, memory 22 is written to. Thus, the present invention overcomes the need to perform two memory accesses (as is required in a read-modify-write sequence) during each occurrence of the STROBE signal.

Figure 3:
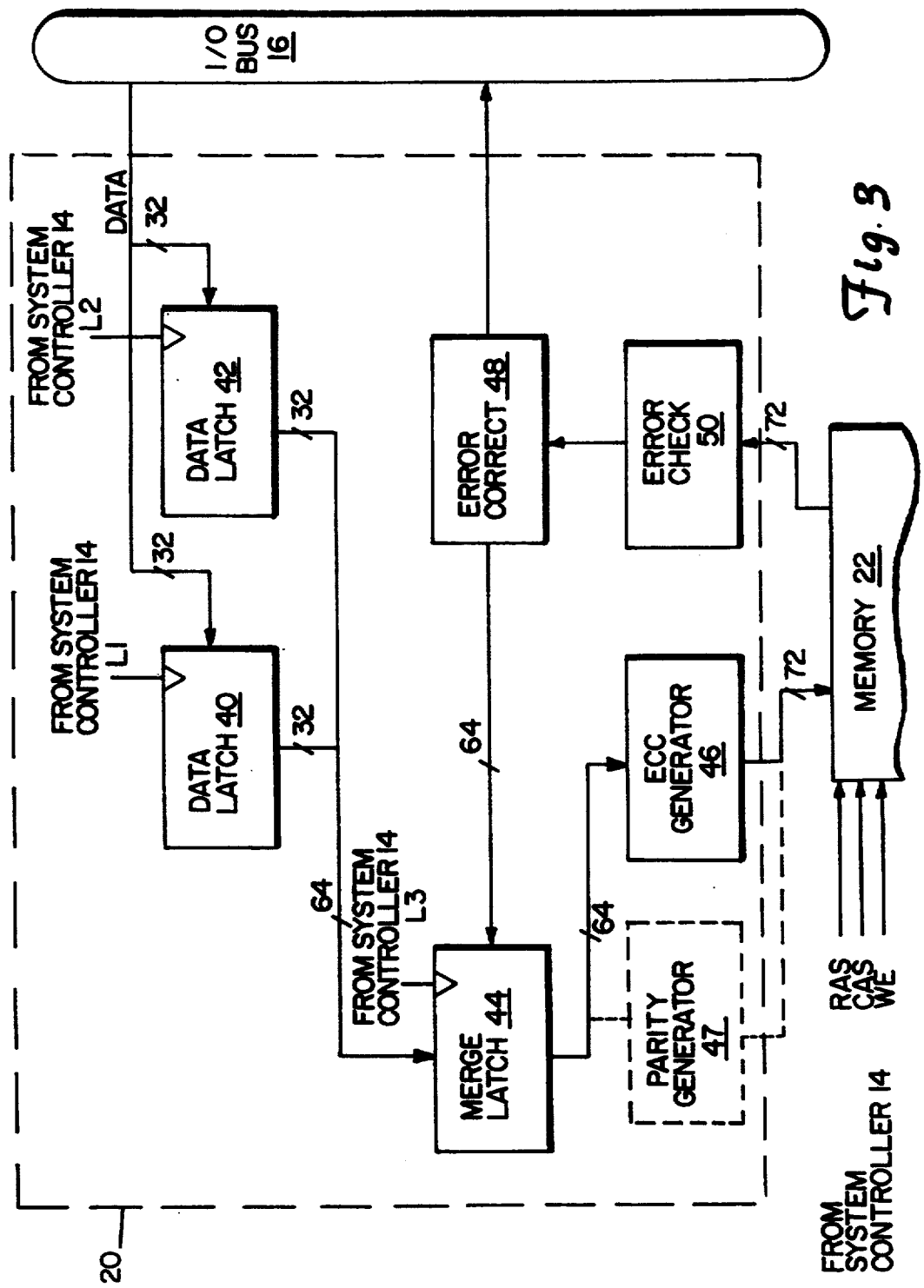
FIG. 3 is a more detailed block diagram of the I/O data buffer shown in FIG. 1.

FIG. 3 is a more detailed block diagram of I/O data buffer 20. I/O data buffer 20 includes first and second data latches 40 and 42, merge latch 44, ECC generator 46, error correct circuit 48 and error check circuit 50. I/O bus 16 provides data to data latches 40 and 42. In this preferred embodiment, I/O bus 16 provides data in 32 bit words. Data latches 40 and 42, in turn, provide a 64 bit segment to merge latch 44. Merge latch 44 provides, at its output, a 64 bit segment to ECC generator 46. To accomplish a write operation, ECC generator 46 generates 8 bits of ECC information for each 64 bit segment which it receives, and provides a 72 bit entity (the 64 bit data segment and 8 bits of ECC information) to memory 22. System controller 14 then causes the 72 bit entity to be written by memory 22.

During a read operation, system controller 14 causes memory 22 to provide a 72 bit entity to error check circuit 50. Based on the 64 bit data segment provided by memory 22, as well as the 8 bits of ECC information appended to the data segment, error check circuit 50 determines whether the 64 bit data segment read from memory 22 contains an error. If so, error correct circuit 48 corrects the error (if it is correctable) and provides the corrected 64 bit data segment to both the I/O bus 16 and merge latch 44. Whether the data segment read from memory 22 is correctable is dependent upon the number of errors detected in error check circuit 50, as well as the particular error correction code being used.

During a data streaming operation, I/O bus 16 provides data latches 40 and 42 with 32 bits of data every 100 nanoseconds (i.e., with each occurrence of the STROBE signal). With a first occurrence of the STROBE signal, system controller 14 provides the RAS, CAS and WE signals to memory 22 to cause the 64 bit data segment, as well as 8 bits of corresponding ECC information, to be read from memory 22 and provided to error check circuit 50. Error check circuit 50 checks for errors in the 64 bit data segment and error correct circuit 48 corrects those errors, if they are correctable. Also, on a first occurrence of the STROBE signal, data latch 40 receives signal L₁ from system controller 14, causing the first 32 bit word received from I/O bus 16 to be latched into data latch 40.

On the second occurrence of the STROBE signal, system controller 14 causes the second 32 bit word to be latched into data latch 42, by providing signal L₂ to I/O data buffer 20. Once the second 32 bit word has been latched into data latch 42, all 64 bits received from I/O bus 16 are provided at the outputs of data latches 40 and 42 to merge latch 44. Merge latch 44 merges the 64 bits provided by I/O bus 16 with the 64 bit segment previously read from the DRAMs in memory 22. This provides a newly modified 64 bit segment which reflects the data provided by I/O bus 16 and which must be written into memory 22. The new 64 bit segment is provided to ECC generator 46 which generates ECC information corresponding to the new 64 bit segment. This entire 72 bit entity is then written into the DRAMs of memory 22 under the control of system controller 14.

The control sequence then starts over with another STROBE signal, another 32 bits of information are latched into data latch 40, and another 64 bit data segment (with 8 bits of ECC information) is read from memory 22. This control sequence continues until all the information which is desired to be transferred by I/O bus 16, has been transferred.

Figure 4:
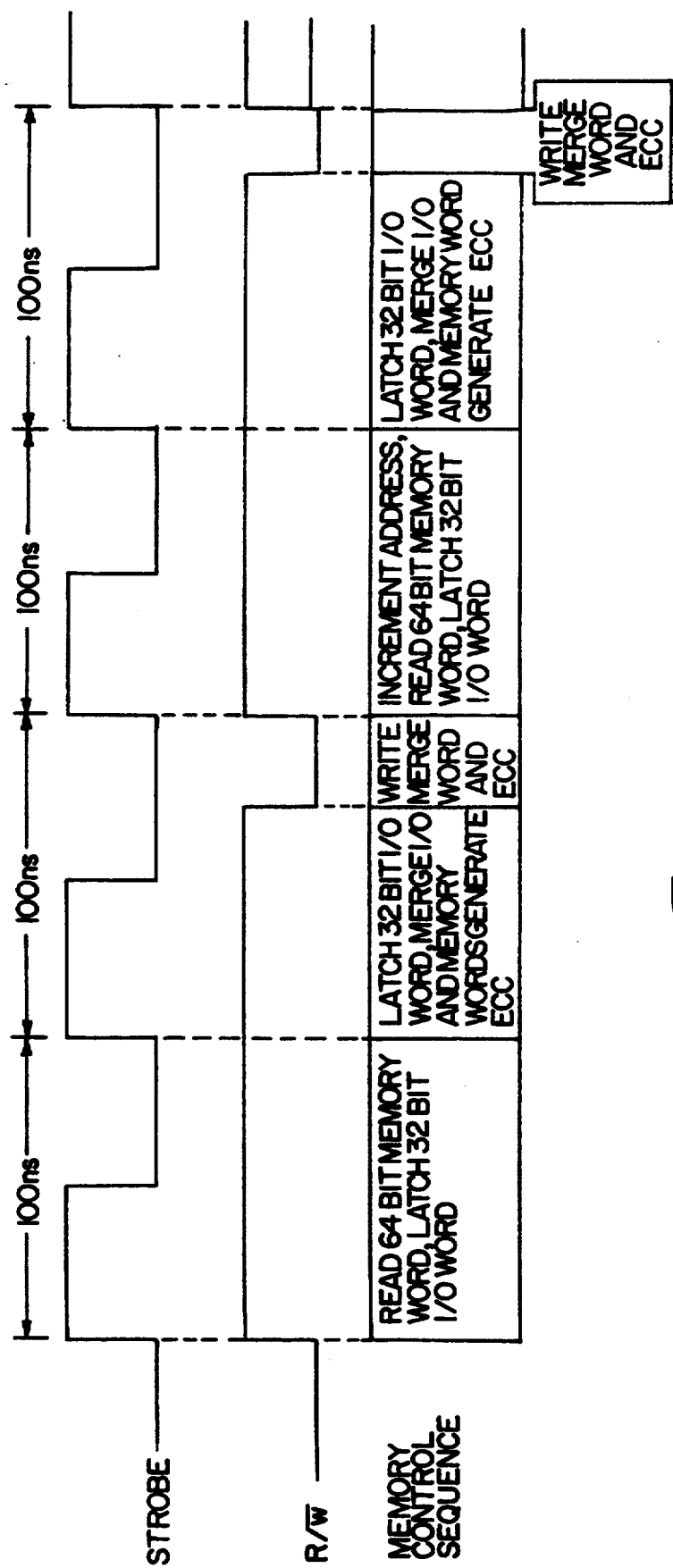
FIG. 4 is a timing diagram showing a memory control sequence according to the present invention.

FIG. 4 is a timing diagram which shows the STROBE signal, an R/$\overline{\text{W}}$ signal which is representative of a read cycle or a write cycle being performed on the DRAMs of memory 22, as well as a corresponding description of the memory control sequence which indicates the operations being performed during each time period. In this preferred embodiment, the STROBE signal is active high. Therefore, the rising edge of the STROBE signal indicates that a 32 bit data word is valid on I/O bus 16. The rising edge of the R/$\overline{\text{W}}$ signal indicates that a read operation is performed on memory 22, while the falling edge of the R/$\overline{\text{W}}$ signal indicates that a write operation is performed on memory 22. Preferably, the read and write operations are performed in page mode as described earlier. However, for the sake of simplicity, all signals required to perform a page mode read or write operation are not shown. Rather, the entire read or write operation is simply represented by one signal (R/$\overline{\text{W}}$) which indicates a read on its rising edge and a write on its falling edge.

Thus, it can be seen from FIG. 4 that on the first rising edge of the STROBE signal, a read operation is performed on the DRAMs of memory 22 at the starting address provided by I/O bus 16. A 64 bit memory segment is read from memory 22 (accompanied by 8 bits of ECC information). Also, on the first rising edge of the STROBE signal, the first 32 bit I/O word from I/O bus 16 is latched into data latch 40.

On the second rising edge of the strobe signal, the second 32 bit I/O word, from I/O bus 16, is latched into data latch 42. Also, the 64 bit segment retrieved from memory 22 is merged with the 64 bits of I/O data received from I/O bus 16 in merge latch 44 and the ECC generator generates ECC information corresponding to the newly merged 64 bit segment. Then, prior to the third rising edge of the STROBE signal, the newly merged 64 bit segment, as well as the ECC information, is written into memory 22. This sequence repeats itself until all the desired data has been transferred.

The I/O bus 16 simply sees consecutive 32 bit write operations. However, the DRAMs of memory 22 see alternating 64 bit read and write operations with each occurrence of the STROBE signal. This sequence can be performed, without end, only breaking for page boundaries, unless only a 32 bit entity is to be written into an odd 32 bit address in memory 22. This could occur, for example, if a large block of data were to be transferred into memory 22 and the first 32 bit word to be transferred does not land on an even 64 bit boundary.

In such a case, system controller 14 reads the entire 64 bit segment from memory 22 which contains the 32 bit word to be modified by the 32 bits transferred from I/O bus 16. System controller 14 latches the single 32 bit word from I/O bus 16. The single 32 bit word is then merged with the 64 bit segment read from memory 22. ECC generator 46 then generates the appropriate ECC information and the 72 bit entity is rewritten to memory 22. In this case, system controller 14 does not perform alternating reads and writes on memory 22. Rather, the data provided from I/O bus 16 must be slowed down (e.g., by data pacing control circuit 36) so that system controller 14 can perform two accesses (a read and a write) on the DRAMs of memory 22 before receiving another STROBE signal or any more data from I/O bus 16. However, once the initial 32 bit word is written into the odd 32 bit address location, the data streaming memory transfer continues as previously described since the data being written to memory 22 is now aligned on even 64 bit boundaries. This provides greatly increased memory transfer rates over previous systems.

Another advantage of the present invention involves the accessing of 64 bits of data from memory 22 at one time. There are 8 ECC bits required for each 64 bits of data. There are also 8 parity bits required for 64 data bits. Therefore, computer systems can utilize the present invention whether they incorporate ECC techniques or simply parity error checking. In the latter case, ECC generator 46 would be replaced by a parity generator 47 (shown in phantom in FIG. 3). In addition, the present invention can be used in a system which is switchable between ECC and parity error checking. Thus, the present invention provides increased adaptability.

Further, by generating the control signals for memory 22 directly from the STROBE signal provided by I/O bus 16, there is no need to synchronize to a processor clock of processor 12. This saves time and improves efficiency.

Thus, the present invention provides a computer system which is a cost effective, high throughput system. By utilizing alternating read and write cycles to a DRAM memory block, and by accessing the DRAM memory block in segments twice as large as those provided by the I/O bus, the present invention is suitable for supporting both ECC and data streaming techniques.

It is worth noting that the present invention has been described with reference to a 32 bit bus master and 64 bit memory accesses. However, the present invention can be used with other size devices such as a 16 bit bus master and either 32 bit or 64 bit memory accesses.

Although the present invention has been described with reference to preferred embodiments, workers skilled in the art will recognize that changes may be made in form and detail without departing from the spirit and scope of the invention.

What is claimed is:

1. A method of writing data to a memory subsystem in a computer system, wherein the data is supplied by an input/output (I/O) bus, and wherein the I/O bus provides a STROBE signal, an occurrence of the STROBE signal being indicative of a time when an I/O data word on the I/O bus is valid, the method comprising:
   storing a first I/O data word, provided by the I/O bus after a first occurrence of the STROBE signal, in data buffer means;
   retrieving a memory data word from the memory subsystem in response to the first occurrence of the STROBE signal;
   storing a second I/O data word, provided by the I/O bus after a second occurrence of the STROBE signal, in the data buffer means;
   modifying the memory data word with the first and second I/O data words to form a modified data word;
   generating error correction code (ECC) data corresponding to the modified data word; and
   writing the modified data word and the ECC data to the memory subsystem.

2. The method of claim 1 wherein writing the modified data word and the ECC data to the memory subsystem occurs prior to a third occurrence of the STROBE signal.

3. The method of claim 1 wherein the memory data word has a length, and wherein the first and second I/O data words have a combined length no greater than the length of the memory data word.

4. The method of claim 3 wherein the length of each I/O data word is 32 bits and wherein the length of the memory data word is 64 bits.

5. The method of claim 1 wherein retrieving a memory data word comprises:
   detecting the first occurrence of the STROBE signal; and
   generating memory subsystem control signals based on the first occurrence of the STROBE signal, to read the memory data word from the memory subsystem.

6. The method of claim 5 wherein the memory subsystem includes dynamic random access memories (DRAMs) and wherein generating memory subsystem control signals comprises:
   generating DRAM control signals to read the memory data word from the DRAMs based on the first occurrence of the STROBE signal.

7. The method of claim 6 wherein generating DRAM control signals comprises:
   generating row address select (RAS) signals, column address select (CAS) signals, and write enable (WE) signals based on the first occurrence of the STROBE signal.

8. The method of claim 7 wherein generating DRAM control signals comprises:
   generating the RAS, CAS, and WE signals so that the DRAMs operate in page mode.

9. The method of claim 1 wherein the second occurrence of the STROBE signal is within approximately 100 nanoseconds of the first occurrence of the STROBE signal.

10. The method of claim 1 and further comprising:
    receiving a starting address from the I/O bus indicative of a starting address for writing the data to the memory subsystem; and
    performing the steps of reading a memory data word and writing the modified data word based on the starting address.

11. The method of claim 10 and further comprising:
    loading the starting address into an address counter, the address counter providing address signals to the memory subsystem based on the address contained in the address counter; and
    incrementing the address in the address counter based on the STROBE signal.

12. A method of writing data from an input/output (I/O) bus to a memory in a computer system, the method comprising:
    receiving an I/O signal from the I/O bus indicative of a time when a data word provided by the I/O bus is valid;
    receiving a starting address from the I/O bus representative of an address in the memory where a first data word from the I/O bus is to be written;
    receiving the data word from the I/O bus;
    determining, based on the starting address, a number of memory words that must be read from the memory before writing the data word to the memory;

reading the desired number of memory words from the memory in response to the I/O signal, a first memory word being read from an address in the memory that corresponds to the starting address;

receiving the I/O signal from the I/O bus a second time;

receiving a second data word from the I/O bus;

modifying the memory words from the memory with the data words from the I/O bus to form a modified word; and writing the modified word to the memory.

13. The method of claim 12 wherein determining a number of memory words comprises:

determining the number of words that must be read to align the address boundaries of the memory words read from the memory and the data word received from the I/O bus based on the starting address.

14. The method of claim 12 and further comprising:

generating error correction code (ECC) information corresponding to the modified word; and wherein writing the modified word includes writing the ECC information to the memory.

15. The method of claim 12 wherein the memory includes memory devices operable in page mode and wherein reading the desired number of memory words comprises:

generating memory control signals to perform a page mode read operation on the memory based on the I/O signal.

16. The method of claim 12 wherein the memory includes memory devices operable in page mode and wherein the step of writing the modified word to the memory comprises:

generating memory control signals to perform a page mode write operation on the memory based on the I/O signal.

17. A memory controller in a computer system having a microprocessor, an input/output (I/O) bus providing a STROBE signal indicative of a time when a data word on the I/O bus is valid, and dynamic random access memory (DRAM), the memory controller comprising:

a first data buffer, coupled to the I/O bus, for receiving a first data word from the I/O bus in response to a first occurrence of the STROBE signal;

reading means, coupled to the DRAM, for reading and storing a memory word from the DRAM in response to the first occurrence of the STROBE signal;

a second data buffer, coupled to the I/O bus, for receiving a second data word from the I/O bus in response to a second occurrence of the STROBE signal;

modifying means, coupled to the first and second data buffers and the reading means, for modifying the memory word with the first and second data words to form a write data word;

error correction code (ECC) generating means, coupled to the reading means, for generating ECC information corresponding to the write data word; and writing means, coupled to the reading means, for writing the write data word and the corresponding ECC information to the DRAM, the modifying means forming the write data word and the ECC generating means generating the ECC information after the second occurrence of the STROBE signal and the writing means writing the write data word to the DRAM before a third occurrence of the STROBE signal.

18. The memory controller of claim 17 wherein the DRAM is operable in page mode and wherein the reading means comprises:

means, coupled to the DRAM and receiving the STROBE signal, for generating DRAM control signals to perform a page mode read operation on the DRAM based on the STROBE signal.

19. The memory controller of claim 17 wherein the DRAM is operable in page mode and wherein the writing means comprises:

means, coupled to the DRAM and receiving the STROBE signal, for generating DRAM control signals to perform a page mode write operation on the DRAM in response to the STROBE signal.

20. The memory controller of claim 17 wherein the first and second data words each contain no more than one half as many bits as the memory word.

21. An apparatus for writing data to a memory subsystem in a computer system, wherein the data is supplied by an input/output (I/O) bus, and wherein the I/O bus provides a STROBE signal, an occurrence of the STROBE signal being indicative of a time when an I/O data word on the I/O bus is valid, the apparatus comprising:

first storing means, coupled to the I/O bus, for storing a first I/O data word provided by the I/O bus after a first occurrence of the STROBE signal;

reading means, coupled to the memory subsystem, for reading a memory data word from the memory subsystem in response to the first occurrence of the STROBE signal;

second storing means, coupled to the I/O bus, for storing a second I/O data word, provided by the I/O bus after a second occurrence of the STROBE signal;

modifying means, coupled to the reading means and the first and second storing means, for modifying the memory data word with the first and second I/O data words to form a modified data word;

generating means, coupled to the modifying means, for generating error detection information corresponding to the modified data word; and writing means, coupled to the memory subsystem, for writing the modified data word and the error detection information to the memory subsystem.

22. The apparatus of claim 21 wherein the generating means generates error correction code (ECC) information corresponding to the modified data word.

23. The apparatus of claim 21 wherein the generating means generates parity information corresponding to the modified data word.

24. The apparatus of claim 21 wherein the memory subsystem includes dynamic random access memories (DRAMs) operable in page mode and wherein the reading means comprises:

memory control signal generating means for generating memory control signals, based on the STROBE signal from the I/O bus, to perform a page mode read operation on the DRAMs to read the memory data word from the memory subsystem.

25. The apparatus of claim 21 wherein the memory subsystem includes dynamic random access memories (DRAMs) operable in page mode and wherein the writing means comprises:

memory control signal generating means for generating memory control signals, based on the STROBE signal from the I/O bus, to perform a page mode write operation on the DRAMs to write the modified data word and the error detection information to the memory subsystem.

26. The apparatus of claim 21 wherein the first and second I/O data words each contain no more than one half as many bits as the memory data word.

27. The apparatus of claim 26 wherein the length of each I/O data word is 32 bits and wherein the length of the memory data word is 64 bits.

28. The apparatus of claim 26 wherein the length of each I/O data word is 16 bits and wherein the length of the memory data word is 64 bits.

* * * * *